(12) United States Patent
Schmidt et al.

(10) Patent No.: US 10,771,282 B2
(45) Date of Patent: Sep. 8, 2020

(54) METHOD FOR TRANSMITTING MESSAGES BETWEEN CONTROL UNITS OF A MOTOR VEHICLE, AND SWITCH APPARATUS, AND MOTOR VEHICLE

(71) Applicant: AUDI AG, Ingolstadt (DE)

(72) Inventors: Karsten Schmidt, Ingolstadt (DE); Daniel Kerk, Nuremberg (DE); Felix Reimann, Fuerth (DE); Peter Tröger, Potsdam (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/461,746

(22) PCT Filed: Sep. 14, 2017

(86) PCT No.: PCT/EP2017/073087
§ 371 (c)(1),
(2) Date: May 16, 2019

(87) PCT Pub. No.: WO2018/095604
PCT Pub. Date: May 31, 2018

(65) Prior Publication Data
US 2019/0319819 A1   Oct. 17, 2019

(30) Foreign Application Priority Data
Nov. 28, 2016  (DE) .................. 10 2016 223 533

(51) Int. Cl.
*H04L 12/40* (2006.01)
*H04L 12/815* (2013.01)
*H04L 12/833* (2013.01)

(52) U.S. Cl.
CPC .... *H04L 12/40163* (2013.01); *H04L 12/4013* (2013.01); *H04L 47/22* (2013.01); *H04L 47/2458* (2013.01); *H04L 2012/40241* (2013.01)

(58) Field of Classification Search
CPC ........... H04L 12/40163; H04L 12/4013; H04L 47/22; H04L 47/2458; H04L 2012/40241;
(Continued)

(56) References Cited

U.S. PATENT DOCUMENTS 6,388,993 B1     5/2002  Shin et al.
6,782,428 B1 *  8/2004  Gleeson ................. H04L 47/10
                                                                 370/395.21
(Continued)

FOREIGN PATENT DOCUMENTS

AT        512742 A1    10/2013
DE     10309164 A1     9/2004
(Continued)

OTHER PUBLICATIONS

German Office Action dated May 26, 2020 from German Patent Application No. 10 2016 223 533.8, 10 pages.
(Continued)

*Primary Examiner* — Hardikkumar D Patel
(74) *Attorney, Agent, or Firm* — Staas & Halsey LLP

(57) ABSTRACT

In a motor vehicle, messages from control units arrive at input ports of a switch apparatus with each message indicating a destination address and a priority level. Each input port of the switch apparatus receives at most messages with a predetermined maximum data volume overall, for one priority level or for some or all of the priority levels, during each predetermined unit of time. The received messages are assigned to output port(s) based on their destination address and the messages assigned to each output port are sent
(Continued)

onward. This guarantees time limits for the respective transmission period.

20 Claims, 1 Drawing Sheet

(58) Field of Classification Search
CPC ... H04L 12/801; H04L 12/841; H04L 12/863; H04L 47/28; H04L 12/6418; H04L 47/50; H04L 47/12; H04L 12/4015; H04L 12/64; H04L 29/08; H04L 67/10; H04L 49/103; H04L 49/35; H04L 12/26; H04L 43/026; H04L 43/0858; H04L 43/106; H04L 12/43; H04L 12/56; H04L 47/6215; H04L 49/3018; H04L 49/506; H04L 49/90; H04L 49/9047; H04L 49/9078; H04L 49/901; H04L 67/322; G06F 15/173; G06F 15/17331; G06F 12/0835; G06F 12/1081

See application file for complete search history.

(56) References Cited

U.S. PATENT DOCUMENTS

| | | | | |
|---|---|---|---|---|
| 6,798,743 | B1* | 9/2004 | Ma | H04L 47/10 370/235 |
| 7,246,171 | B1* | 7/2007 | Ambrose | H04L 67/06 370/468 |
| 2007/0116025 | A1 | 5/2007 | Yadlon et al. | |
| 2009/0199207 | A1* | 8/2009 | Thomas | G06F 9/546 719/314 |
| 2015/0043360 | A1 | 2/2015 | Poledna | |
| 2016/0232126 | A1 | 8/2016 | Poledna et al. | |
| 2016/0294697 | A1* | 10/2016 | Varadarajan | H04L 47/28 |

FOREIGN PATENT DOCUMENTS

| | | |
|---|---|---|
| DE | 102007061986 A1 | 6/2009 |
| DE | 102011076357 A1 | 11/2012 |
| DE | 102012207952 A1 | 11/2013 |
| DE | 102016223533.8 | 11/2016 |
| WO | 2010/136023 A1 | 12/2010 |
| WO | PCT/EP2017/073087 | 9/2017 |

OTHER PUBLICATIONS

TTTech Computertechnik AG: "TTEthernet—A Powerful Network Solution for All Purposes", Scalable Real-Time Ethernet Platform, 2010, pp. 1-15.
International Search Report for PCT/EP2017/073087 dated Nov. 8, 2017.
German Office Action for Application No. 102016223533.8 dated Jun. 22, 2017.
E. Matzol; "Ethernet in Automotive Networks"; KTH Master of Science Thesis; 2011; 72 pages.
Office Action dated Oct. 29, 2019 in corresponding Chinese Patent Application No. 201780070233.0.
English Translation by WIPO dated May 31, 2019 of the International Preliminary Report on Patentability in corresponding International Patent Application No. PCT/EP2017/073087.

* cited by examiner

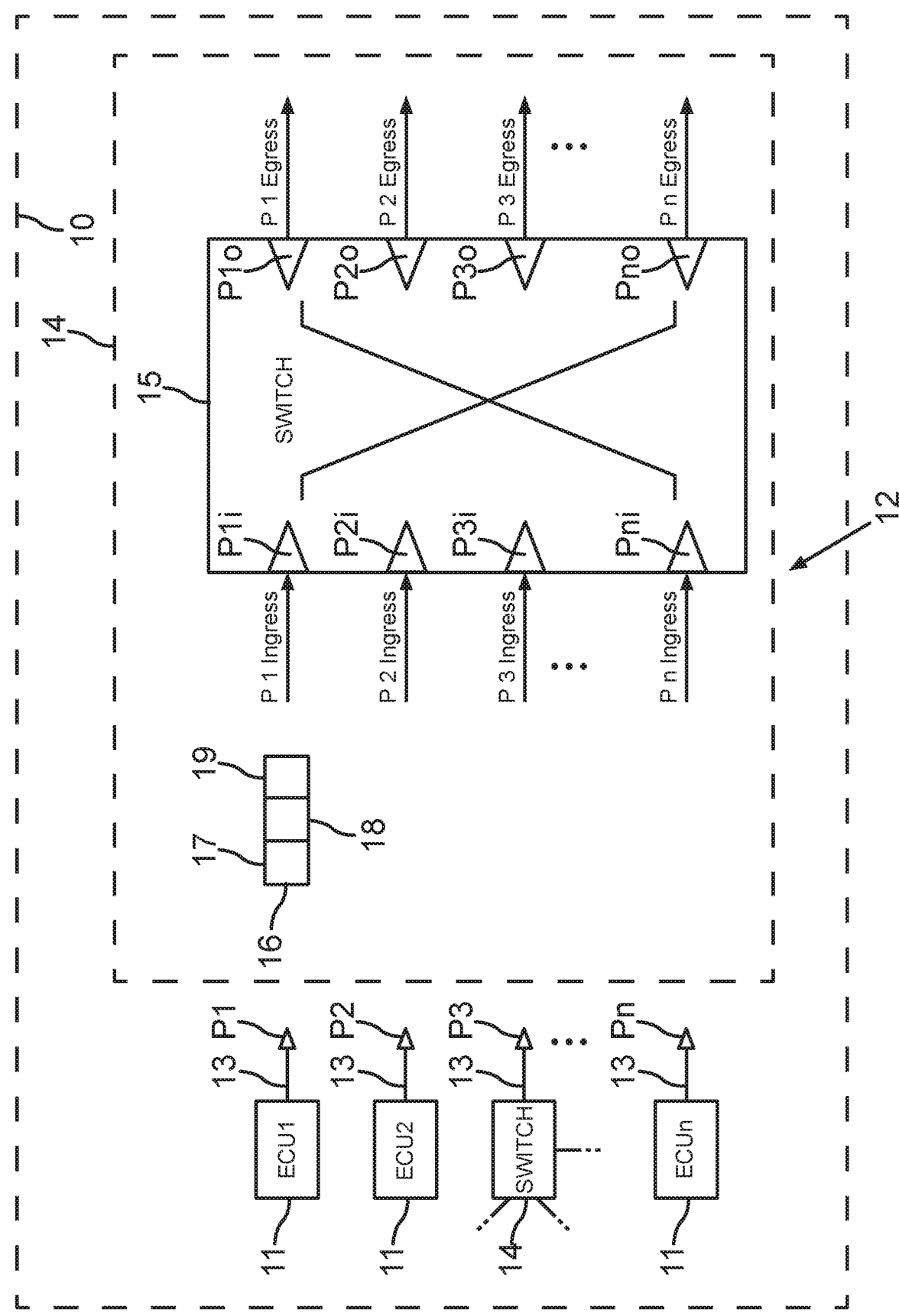

METHOD FOR TRANSMITTING MESSAGES BETWEEN CONTROL UNITS OF A MOTOR VEHICLE, AND SWITCH APPARATUS, AND MOTOR VEHICLE

CROSS REFERENCE TO RELATED APPLICATIONS

This application is the U.S. national stage of International Application No. PCT/EP2017/073087, filed Sep. 14, 2017, and claims the benefit thereof. The International Application claims the benefit of German Application No. 10 2016 223 533.8 filed on Nov. 28, 2016, both applications are incorporated by reference herein in their entirety.

BACKGROUND

Described below is a method for transmitting messages between control units of a motor vehicle. The messages are transmitted as data packets via a data network in which at least one switch apparatus (switch) forwards or assigns the messages.

In a motor vehicle, a requirement is usually imposed on the data network with respect to the temporal behavior in order to limit a maximum transmission period for certain messages, for example from a safety-relevant driver assistance system. Time-controlled approaches in the form of data buses, such as FlexRay or the TTEthernet or TTP, are known for this purpose. These are based on a time-controlled transmission plan or schedule which must be implemented in all control units involved. However, this results in the entire data network being based on a global static schedule which requires an adaptation for all control units if a new control unit is intended to be retrofitted.

DE 103 09 164 A1 discloses a method for providing a schedule in a so-called switched network. Data messages to be transmitted in real time are transmitted separately from other data messages. However, this means that the real-time data messages must wait during the transmission of the other data messages.

DE 10 2011 076 357 A1 discloses a data network for an aircraft, in which data are provided with priorities in order to hereby give preference to the forwarding of particularly important data. However, this cannot prevent a control unit having a multiplicity of unimportant data packets from still being able to hinder the data traffic in the network.

DE 10 2007 061 986 A1 discloses a method for also being able to provide packet-based data traffic in a time-controlled bus system, for example the FlexRay bus.

WO 2010/136023 A1 discloses a method for optimizing packet-based data transmission. Data packets are here provided with a priority in order to be able to transmit them in the order of their importance in the local Ethernet network. Data packets having a high priority can be passed via their own queue.

SUMMARY

Described below is a method that is able to limit a maximum delay or latency of at least some of the messages to be transmitted to a predetermined maximum value in a data network of a motor vehicle. The method can be used to transmit communications or messages between control units of a motor vehicle. A switch, which is referred to as a switch apparatus below, is used for this purpose. Another name for such a switch apparatus is also a data selector or bridge. A message should be understood as meaning a data packet which contains or has an indication of a destination address and a priority level. The switch apparatus connects network branches of a data network, wherein either a control unit or a further switch apparatus can be respectively connected to each network branch. A network branch can be formed, for example, by a network cable or a radio path. In particular, a maximum of only one control unit or one further switch apparatus is provided for each network branch. The messages from the control units arrive at a respective input port of the switch apparatus via a respective network branch.

The switch apparatus can discern from an arriving message where the message is intended to be forwarded to (indicated by the destination address) and (with accordingly tagged frames) how important the message is, that is to say what priority level the message has. The method does not begin with the forwarding of messages on the basis of their priority, but rather at the input port during the reception of each message. For each input port, the switch apparatus respectively receives at most so many messages, in each case for one of the priority levels or else for some or all of the priority levels, for each predetermined unit of time that they correspond overall to a predetermined maximum data volume per unit of time. A maximum data volume per unit of time is therefore accepted at most for each priority level. Further messages which arrive within the unit of time, and as a result of which the maximum data volume would be exceeded, are therefore rejected. Only the received messages are then each assigned to an output port on the basis of their destination address. The assigned messages are then emitted at each output port according to their priority.

The method provides the advantage that an arbitrary number of messages is not forwarded from a network branch to other network branches through the switch apparatus. Outside the network branch of the transmitting control unit, messages of a predetermined priority level can generate, on the far side of the switch apparatus in other network branches, only as much data traffic as is predefined or allowed by the predefined maximum data volume per unit of time. If a transmitting control unit therefore emits messages with a low priority level, this has only a limited influence on the data communication in other network branches of the data network. A "blockage" or overloading of output ports of the switch or of the switch apparatus by messages of the various priority levels therefore cannot occur. This guarantees the time properties (for example latency).

Limiting the data volume to at most or maximally the maximum data volume therefore limits the data rate which is received in the form of messages of a respective priority level via the input port or is accepted for forwarding. However, the problem when calculating the data rate may be that the maximum data rate can be briefly exceeded within the unit of time and the permissible maximum data rate then just results again only when averaged over the entire unit of time. However, other messages are then blocked, under certain circumstances, for the period for which the data rate is exceeded within the unit of time. In order to avoid this, provision may be made for a number of messages to be respectively determined at each input port for the priority levels and for the number of messages per unit of time to be limited. The switch apparatus therefore concomitantly counts how many messages of the monitored priority level are received. If the maximum number of messages has been reached, no further messages of the priority level are accepted for this unit of time. Therefore, a permissible average value thus cannot be briefly exceeded.

The messages accepted for forwarding are passed to the respective output port in the described manner. The assigned messages are then emitted at the respective output port in the order of their priority levels. Messages are therefore likewise forwarded from the switch apparatus on the basis of the priority levels. A transmission order of the messages according to the priority is therefore stipulated. The transmission behavior of the switch apparatus is therefore likewise controlled by the priority levels.

The value of the maximum data volume can be analytically determined on the basis of desired or predefined transmission latencies. Only an off-line calculation is required for this purpose, but this is considerably easier than calculating completely everything during ongoing operation. The maximum data volume determined for at least one priority level can therefore be determined on the basis of a maximum value of a transmission delay or latency. This is possible in the case of a motor vehicle since the messages which are generated by control units in a motor vehicle are so-called static messages, that is to say it is known from the outset, on account of the design of the motor vehicle, which control unit generates how many messages of which message type in which situation. A worst-case scenario with respect to the number and the transmission time can now be assumed for each control unit and, on the basis of the highest (most important) priority level, it can then be determined how many messages then need to be transmitted and it can be determined what transmission delay may arise for these messages. The maximum permissible values (maximum values) for the maximum data volume for the lower priority levels then respectively gradually follow therefrom if the total data volume which can actually be transmitted in one unit of time by the switch apparatus is predefined on the basis of the design. During the calculation, the low-priority messages are therefore less relevant for a message, but rather, in particular, the influence of all messages of equal or higher priority (from the same input and from other network branches).

In order to avoid manipulation of the priority level by a control unit, the respective priority level may be indicated in the messages by cryptographically encrypted priority data. The control apparatus then decrypts the priority data using a cryptographic key. In other words, the transmitting control unit can therefore enter its priority level itself but must do so by cryptographically encrypted priority data which are accepted by the switch apparatus only if the cryptographic key of the switch apparatus matches the cryptographically encrypted priority data. This makes it possible to avoid the situation in which a control unit independently provides a higher priority level for its messages. This is because messages whose priority data cannot be decrypted by the switch apparatus are discarded. Additionally or alternatively, the switch apparatus may internally may have a cryptographically secure configuration which is not intended to be able to be manipulated from the outside. If messages with an invalid configuration arrive at the switch (that is to say do not conform to the configuration inside the switch), the switch can discard these and can therefore keep the network "clean".

In order to prevent the situation in which messages are intended to be emitted at the same time in a network branch and one is therefore delayed, provision may be made for the control units to also be coordinated with one another when transmitting messages. At least two of the control units then carry out time synchronization of respective timers of the control units with one another. Such a timer may be, for example, a clock or a counter. The synchronized control units then emit messages with a time delay with respect to one another. The transmission behavior of the control units is therefore interlaced, with the result that the messages from both control units arrive at the switch apparatus alternately or at least individually without collisions. In particular, this is advantageous if the messages from at least one of the two control units represent or transport a video signal or generally a broadband signal. A broadband signal is understood as meaning a signal whose bandwidth or data rate is greater than 10%, in particular greater than 30 or 40%, of the net data rate of the data network, in general, and of the network branch of the control unit, in particular. Another example of a broadband signal is a radar signal.

Two video streams from two control units, for example, can therefore be transmitted in a manner interlaced in one another by alternately emitting the messages from both control units via the data network and/or the switch apparatus.

By virtue of the fact that the transmission of the messages between control units is limited by the switch apparatus to the effect that excess messages (which exceed the maximum data volume per unit of time) are ignored or discarded by the switch apparatus and the switch apparatus emits the messages with a higher priority level before messages with a lower priority level at the output ports, there is no need for a global schedule, by which the control units would have to be implicitly coordinated. The control units therefore may emit their messages independently of a global transmission plan or schedule which would therefore be necessary for the entire motor vehicle or its control units in order to determine transmission times and/or the number of messages for each control unit. Therefore, there is no need to previously adjust the control units. A control unit can therefore also be subsequently installed without the need to adapt the transmission behavior of the other control units.

The has connection ports for connecting network branches of a data network. Such a connection port can therefore be configured to electrically and mechanically connect a network cable of a network branch. At least some of these connection ports are set up for operation as a receiving port and at least some of the connection ports are set up for operation as a transmitting port or output port. This can be provided by providing corresponding receiving circuits and/or transmitting circuits for the respective connection port. The switch apparatus is also provided with a processor device which is set up to carry out an embodiment of the method described herein. For this purpose, the processor device may have at least one microprocessor and/or at least one microcontroller. The processor device may also have a program code which is set up to carry out the embodiment of the method when executed by the processor device. The program code can be stored in a data memory of the processor device.

The motor vehicle has a data network in which the control units can interchange messages via the switch apparatus. The motor vehicle therefore has a switch apparatus or a plurality of switch apparatuses, via which control units are respectively coupled for the purpose of interchanging messages. In this case, the at least one switch apparatus is one embodiment of the switch apparatus. Additionally or alternatively, provision may be made for the control units to be set up to emit their messages in a synchronized manner with a time delay with respect to one another in order to hereby avoid a collision of message transmission times. Overall, it is therefore ensured in the motor vehicle that the control units can emit their messages independently of a global transmission plan or schedule.

The motor vehicle may be an automobile, in particular a passenger vehicle or a truck.

BRIEF DESCRIPTION OF THE DRAWINGS

These and other aspects and advantages will become more apparent and more readily appreciated from the following description of exemplary embodiment, taken in conjunction with the accompanying drawing in which the single FIGURE is a schematic illustration of an embodiment of the motor vehicle.

DETAILED DESCRIPTION OF THE PREFERRED EMBODIMENT

In the exemplary embodiment, the described components of the embodiment are each individual features which can be considered independently of one another and each also contributes to the method independently of one another and can therefore also be considered to be part of a combination other than that shown. Furthermore, the described embodiment can also be supplemented with further features which have already been described.

The FIGURE shows a motor vehicle 10 which may be, for example, an automobile, in particular a passenger vehicle or a truck. In the motor vehicle 10, control units 11 can be coupled to one another via a data network 12. The data network 12 may be an Ethernet network, in particular. The data network 12 may have network branches 13, each of which can be formed by a network cable, for example. The network branches 13 can also be connected or linked to the data network 12 via switch apparatuses 14. One of the switch apparatuses 14 is illustrated on an enlarged scale in order to illustrate the structure of the switch apparatus 14. The switch apparatus 14 may have connection ports P1, P2, P3, Pn . . . , Pn (n is the total number of connection ports) in a manner known per se. In this case, each connection port can be simultaneously operated as a receiving port Ingress and as an output port Egress. For this reason, the connection ports P1, P2, P3, . . . , Pn are represented twice in the FIGURE: the connection port P1 therefore has a receiving part P1i and an output part or transmitting part P1o. A corresponding situation is illustrated for the other connection ports P2, P3, . . . , Pn. Each receiving part constitutes an input port P1i, P2i, P3i, . . . , Pni and each transmitting part constitutes an output port P1o, P2o, P3o, . . . , Pno.

Each of the control units 11 can be connected to one of the connection ports P1, P2, . . . , Pn via a network branch 13. The FIGURE illustrates, by way of example, how the control unit ECU1 can be connected to the connection port P1, how the control unit ECU2 can be connected to the connection port P2 and how the control unit ECUn can be connected to the connection port Pn.

A further switch apparatus 14 may be connected, by way of example, to at least one connection port (here P3, for example). The connection ports P1, P2, P3, . . . , Pn can be coupled in a manner known per se using a switch matrix 15 of the switch apparatus 14.

The switch apparatus 14 can respectively receive messages 16 from the control units 11 and/or from at least one further connected switch apparatus 14. Each message 16 may contain useful data 17 and an indication of a destination address 18 and a priority level 19. The switch apparatus 14 ensures a temporal determinism, with the result that a maximum temporal delay of the messages is limited or determined on the basis of the respective priority level 19 of the message 16. The determinism of the communication relationships between the control units 11 is also ensured without the control units 11 interchanging their messages 16 in the data network 12 according to a predetermined overall vehicle schedule.

This results in flexibility in the data communication by virtue of control units 11 being able to be replaced or removed or new control units 11 being able to be added without the determinism with respect to the temporal delay for messages 16 at least with the highest priority level 19 being lost in this case.

In this respect, the switch apparatus 14 makes it possible to structure the data traffic, for example in an Ethernet network, by indicating a priority level 19 in a message 16. The choice of priority levels 19 for messages 16 of different message types makes it possible, in combination with the restriction of the data rate for arriving messages 16 of a given priority level 19, to ensure the temporal determinism overall.

For this purpose, the incoming messages 16 are limited at the input ports P1i, P2i, P3i, . . . , Pni (ingress ports) using the data rate for each priority level 19. The messages 16 which have been accepted or forwarded by the switch apparatus 14 are transmitted at the output ports P1o, P2o, P3o, . . . , Pno (egress ports) in the order of their priority according to the priority level 19.

Therefore, the messages 16 must be prioritized by the control units 16 according to their communication requirements only by indicating the priority level 19. All switches 14 can be configured in such a manner that they allow no more incoming communication than is stipulated. In other words, only a maximum data volume per unit of time and per priority level is accepted by the respective switch apparatus 14 at each input port or ingress port. The data rate of incoming messages 16 is therefore limited at the input ports by stipulating a maximum permitted data volume for each time window or a maximum permitted number of messages for each time window per input port and priority level, for example. The accepted or received messages are then transmitted at the output ports or egress ports according to their priority level.

If all messages are statically stipulated in the motor vehicle 10, that is to say the worst-case scenario of the number of messages to be transmitted is known, the maximum delay in the switch apparatus 14 can be calculated for each message 16 by the combination of the limitation of the maximum data volume at the input and the prioritization at the output ports. On the basis thereof, this can be determined and therefore predicted or ensured for the entire connection route or communication connection of two control units 11 taking into account the topology or connection structure of the network branches 13 in the data network 12.

Time synchronization of control units is not absolutely necessary in this case but can additionally reduce a guaranteed transmission latency. This can be carried out by avoiding a collision on account of two messages transmitted at the same time by virtue of synchronized control units 11 emitting their messages 16 with a time delay with respect to one another. Messages at least of the lowest priority level can be emitted by any control unit 11 in an arbitrary number without this blocking messages of higher priority levels.

Overall, the example shows how the method can ensure a temporal determinism by priorities in a data network of a motor vehicle.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for transmitting messages between control units of a motor vehicle by a switch apparatus, comprising:
    receiving the messages from the control units at input ports of the switch apparatus, each of the messages containing an address indication of a destination address and a priority indication of a priority level from among a plurality of predetermined priority levels, each input port of the switch apparatus receiving at most a predetermined maximum data volume overall, for at least one priority level and for each predetermined unit of time;
    assigning each of the messages received at the input ports to an output port based on the destination address;
    outputting, at each output port, the messages assigned to the output port;
    carrying out, by at least two of the control units, time synchronization of respective timers of the control units with one another;
    outputting, by synchronized control units, the messages with a time delay, such that transmission of the messages by the synchronized control units is interlaced and the messages from the synchronized control units arrive at the switch apparatus alternately and without collisions, the priority levels being indicated in the messages by cryptographically encrypted priority data; and
    at least one of decrypting the priority data by the switch apparatus based on a cryptographic key, and the switch apparatus having a cryptographically secure internal configuration.

2. A method according to claim 1, wherein a number of messages, determined for the priority levels at each input port, is limited per unit of time.

3. A method according to claim 2, wherein the messages are emitted at the output ports in order of the priority levels of the messages being output.

4. A method according to claim 3, wherein a maximum value of a transmission delay is predefined for at least one priority level and the maximum data volume is determined based on the maximum value.

5. A method according to claim 4, wherein the messages from at least one of the synchronized control units represent a broadband signal having a data rate at least 10% of a net data rate of a data network in the motor vehicle.

6. A method according to claim 5, wherein the control units emit the messages independently of a global transmission plan, and a predefined time limit for respective transmission times of the messages is ensured.

7. A method according to claim 1, wherein the messages are emitted at the output ports in order of the priority levels of the messages being output.

8. A method according to claim 1, wherein a maximum value of a transmission delay is predefined for at least one priority level and the maximum data volume is determined based on the maximum value.

9. A method according to claim 1, wherein the messages from at least one of the synchronized control units represent a broadband signal having a data rate at least 10% of a net data rate of the data network.

10. A method according to claim 1, wherein the control units emit the messages independently of a global transmission plan, and a predefined time limit for respective transmission times of the messages is ensured.

11. A switch apparatus for a motor vehicle having control units and a data network with network branches, comprising:
    connection ports provided to connect the network branches of the data network, at least some of the connection ports set up for operation as input ports receiving messages transmitted with a time delay by at least two of the control units performing time synchronization, such that the messages are interlaced and arrive at the switch apparatus alternately and without collisions, and at least some of the connection ports set up for operation as output ports; and
    a processor configured to
        control the messages received at the input ports with an address indication of a destination address and a priority indication of a priority level from among a plurality of priority levels indicated by cryptographically encrypted priority data, each input port of the switch apparatus receiving at most a predetermined maximum data volume overall, for at least one priority level during each predetermined unit of time,
        assign each of the messages received at the input ports to one of the output ports, based on the destination address, that outputs each of the messages assigned thereto, and
        at least one of decrypt the priority data based on a cryptographic key, and the switch apparatus having a cryptographically secure internal configuration.

12. The switch apparatus according to claim 11, wherein a number of messages, determined for the priority levels at each input port, is limited per unit of time.

13. The switch apparatus according to claim 12, wherein the messages are emitted at the output ports in order of the priority levels of the messages being output.

14. The switch apparatus according to claim 13, wherein a maximum value of a transmission delay is predefined for at least one priority level and the maximum data volume is determined based on the maximum value.

15. The switch apparatus according to claim 11, wherein the messages are emitted at the output ports in order of the priority levels of the messages being output.

16. The switch apparatus according to claim 11, wherein a maximum value of a transmission delay is predefined for at least one priority level and the maximum data volume is determined based on the maximum value.

17. A motor vehicle, comprising:
    a data network with network branches;
    control units outputting messages, containing an address indication of a destination address and a priority indication of a priority level from among a plurality of priority levels indicated by cryptographically encrypted priority data, at least two of the control units performing time synchronization, such that the messages are output interlaced with a time delay that prevents collisions; and
    at least one switch apparatus, via which the control units are coupled and the messages are interchanged, the at least one switch apparatus respectively including
        connection ports connected to the network branches of the data network, at least some of the connection ports set up for operation as input ports receiving the messages transmitted from the control units, each input port receiving at most a predetermined maximum data volume overall for at least one priority level during each predetermined unit of time, and at least some of the connection ports set up for operation as output ports outputting the messages assigned thereto, and
a processor configured to
control the messages received at the input ports,
assign each of the messages received at the input ports to one of the output ports based on the destination address, and
at least one of decrypt the priority data based on a cryptographic key, and the switch apparatus having a cryptographically secure internal configuration.

18. The motor vehicle according to claim 17, wherein the messages from at least one of the synchronized control units represent a broadband signal having a data rate at least 10% of a net data rate of the data network in the motor vehicle.

19. The motor vehicle according to claim 18, wherein the control units emit the messages independently of a global transmission plan, and a predefined time limit for respective transmission times of the messages is ensured.

20. The motor vehicle according to claim 17, wherein the control units emit the messages independently of a global transmission plan, and a predefined time limit for respective transmission times of the messages is ensured.

\* \* \* \* \*